United States Patent [19]
Boyce

[11] 3,941,604
[45] Mar. 2, 1976

[54] FAST-FIRING CERAMIC COMPOSITION AND CERAMIC ARTICLE MADE THEREFROM

[75] Inventor: Walter A. Boyce, Glen Ridge, N.J.

[73] Assignee: Westinghouse Electric Corporation, Pittsburgh, Pa.

[22] Filed: Mar. 22, 1971

[21] Appl. No.: 126,485

[52] U.S. Cl. .................. 106/39.5; 106/46; 106/68; 264/61; 264/63; 313/221; 65/18; 65/22; 65/28
[51] Int. Cl.² C09D 11/12; C04B 33/26; C04B 35/14; E05C 7/06
[58] Field of Search ............ 264/63, 61; 106/39, 46, 106/68; 65/18, 22, 28; 313/221

[56] References Cited
UNITED STATES PATENTS

| | | | |
|---|---|---|---|
| 2,304,562 | 12/1942 | Gerisch | 65/18 X |
| 2,366,473 | 1/1945 | Bair | 65/18 X |
| 2,517,019 | 8/1950 | Nordberg | 106/52 X |
| 2,643,020 | 6/1953 | Dalton | 313/221 X |
| 2,726,963 | 12/1955 | Jackson | 106/46 |
| 2,839,414 | 6/1958 | Fenity et al. | 106/46 |
| 3,137,657 | 6/1964 | Quirk et al. | 106/39 R X |
| 3,423,217 | 1/1969 | Blaha | 106/46 X |
| 3,442,993 | 5/1969 | Yamamoto et al. | 264/61 |
| 3,540,894 | 11/1970 | McIntosh | 106/39 R |

OTHER PUBLICATIONS
W. H. Kohl, Materials and Techniques for Electron Tubes, Reinhold Publishing Corp., 1960, pp. 12, 21, 25, 608 & 609.

*Primary Examiner*—Joseph L. Schofer
*Assistant Examiner*—Herbert J. Lilling
*Attorney, Agent, or Firm*—D. S. Buleza

[57] ABSTRACT

Scrap glass is crushed and mixed with selected quantities of ball clay and wollastonite, the resulting raw-mix is press-molded into a green compact, and the latter is fired in air at a temperature above the softening point of the glass particles to provide a ceramic article that has a dense impervious structure and is electrically non-conductive. Selective amounts of bentonite and an inorganic pigment can also be included in the raw-mix formulation and talc, petalite or potter's flint can be substituted for the wollastonite. By properly correlating the molding pressure and firing schedule with the raw-mix formulation, the ceramic articles can be rapidly and economically mass-produced in various shapes and sizes. The invention is especially adapted for use in fabricating preformed insulator components for electric lamp bases and similar devices and, in addition to reducing their manufacturing cost, recycles large quantities of scrap glass such as bottles and the like which would otherwise pollute the environment.

11 Claims, 3 Drawing Figures

INVENTOR
Walter A. Boyce

D. S. Buleza
AGENT

FAST-FIRING CERAMIC COMPOSITION AND CERAMIC ARTICLE MADE THEREFROM

CROSS-REFERENCE TO RELATED APPLICATIONS

The subject matter of this application is related to the improved lamp base assemblies and basing method disclosed in application Serial No. 209,300 of Richard F. Hasell et al filed December 17, 1971 which application is a continuation-in-part of application Serial No. 126,639 which was filed concurrently herewith and is now abandoned.

BACKGROUND OF THE INVENTION

This invention relates to the art of manufacturing ceramic articles and has particular reference to a novel composition and method which permits such articles to be made on a mass-production basis at low cost.

Various methods for fabricating different kinds of articles using glass-forming materials, pulverized glass or quartz are known in the prior art. In U.S. Pat. No. 845,552 issued Feb. 26, 1907 to Jonkergouw, for example, there is disclosed a process for making glass articles by mixing glass-forming materials such as sand and carbonate of soda with borax and chalk, firing the mixture to produce a frit, and placing the latter into a mold and reheating it for 2 hours or so to form a fused body of glass having the desired shape. A method for forming a porous separator for a storage battery by placing glass particles in a mold and heating them to a temperature sufficient to frit or bond the particles together is disclosed in U.S. Pat. No. 1,051,638 issued Jan. 28, 1913 to Hugh Rodman. Other methods for forming articles by molding and firing a mixture of fused quartz particles and an inorganic binder, or a mixture of a binder such as wax and two powdered glasses that have different melting points, are described in U.S. Pat. Nos. 1,610,182 to Elihu Thompson and 2,197,562 to Gerald E. Reinker, respectively.

The prior art methods and compositions were unsatisfactory in that they required high-firing temperatures or long firing times, expensive raw mix materials, and special molds or time-consuming operations which prevented the articles from being efficiently mass produced.

Briefly, the present invention provides a composition and process which permit dense ceramic articles to be made on a mass production basis with inexpensive and readily available materials. These advantages are achieved by utilizing glass cullet, or other suitable scrap glass such as discarded bottles, as one of the basic ingredients of the raw-mix formulation. The scrap glass is pulverized and mixed with selected amounts of ball clay and a selected refractory mineral (preferably wollastonite) and molded into a compact at a pressure which permits the compact to be rapidly fired in air and transformed into a hard ceramic body of the desired configuration and dimensional tolerances. Selected amounts of bentonite and an inorganic pigment can also be included in the raw mix to facilitate the molding and firing operations and to give the finished article a pleasing body color.

BRIEF DESCRIPTION OF THE DRAWING

A better understanding of the invention will be obtained from the exemplary embodiments shown in the drawing, wherein.

DESCRIPTION OF THE PREFERRED EMBODIMENT

Figure 1:
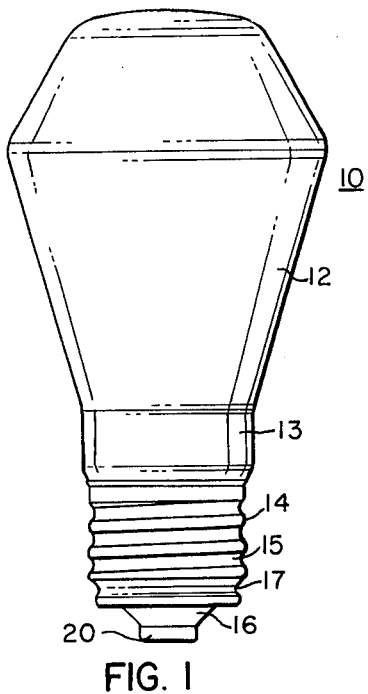
FIG. 1 is a side elevational view of an incandescent lamp bulb having a base assembly which includes a preformed insulator component made in accordance with this invention.

While the composition and method of the present invention can be employed to fabricate various types of ceramic articles, the invention is particularly suited for use in connection with the manufacture of base insulator components for electric lamps of the type used for general lighting purposes. As shown in FIG. 1, such lamps 10 include the usual glass envelope 12 that protectively encloses a suitable light source such as a tungsten filament (not shown) and has its sealed neck portion 13 fitted with a suitable base member 14. In the particular embodiment shown, the base member 14 comprises a threaded metal shell 15 and a preformed ceramic insulator 16 that is mechanically locked to the shell 15 by a peripheral indent 17 and has a metal end cap 20 which is force-fitted onto the end of the insulator and serves as one of the lamp terminals, as disclosed in the aforementioned concurrently-filed application of Hasell et al.

Figure 2:
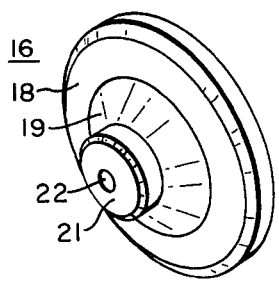
FIG. 2 is an enlarged perspective view of the preformed ceramic insulator used in the lamp shown in FIG. 1.

As will be noted in FIG. 2, the ceramic insulator 16 is of button-like configuration and has a flat rim portion 18 and a protruding frusto-conical medial portion 19 which merges with a cylindrical-shaped boss 21 that has a tapered peripheral edge. A centrally-located aperture 22 in the boss 21 permits one of the lead-wires of the lamp 10 to be threaded through the insulator 16 and connected to the end contact 20 during the basing operation.

In accordance with the present invention, the ceramic insulator (or other article) is formed from a raw-mix composition that contains selected amounts of clay, powdered glass and a refractory mineral (wollastonite, talc, petalite or potter's flint) as essential ingredients. While various types of clay can be used, ball clay is preferred and excellent results have been obtained with a ball clay marketed by the Kentucky-Tennessee Company under the trade designation "Old Mine No. 4". Ball clays are well known in the ceramic art and are classified according to their properties and origin, as disclosed in the article entitled "Ball Clay Classification" beginning at page 59 in the July 1970 issue of "Ceramic Age".

Wollastonite is calcium silicate ($CaSiO_3$), occurs naturally in the form of white-colored fibrous masses and is named after W. H. Wollaston, an English chemist who died in 1828. It melts at 1,540°C.

Talc is also a naturally-occurring mineral, — specifically, $H_2Mg_3(SiO_3)_4$ which is hydrous magnesium silicate (melting point above 1,400°C). It is a soft green-to-grey colored material and different varieties are known in the art as potstone, soapstone, steatite, etc.

Petalite is lithium-aluminum silicate, chemical formula $LiAl\ 2O_5)_2$. It has a melting point of about 1,400°C and occurs in nature in the form of colorless or white (and sometimes reddish or greenish) foliated cleavable masses or monoclinic crystals.

Potter's flint is ground sandstone and quartzite and is thus not a true flint. It does, however, contain large amounts of SiO₂.

While various types of scrap glass can be pulverized and used in the raw-mix composition, a glass which has a low softening point (below about 800°C) is preferred since this will reduce both the firing temperature and time and enable the articles to be quickly produced on a mass-production basis — an essential requirement in the case of lamp bases. Excellent results have been obtained with glass cullet ... that is, the scrap glass produced in electric lamp factories when the filament mount is sealed to the end of the glass bulb and the excess bottom segment or "cullet" portion of the bulb is removed. Glass cullet is also produced in glass plants which make tubing for fluorescent lamps and large quantities are thus readily available at very low cost.

Technically speaking, glass cullet is soda-lime silicate glass which has a softening point of approximately 693°C and a working range of approximately 1,000°C. The chemical composition of this type glass and the ranges of the various constituents, as well as the specific amounts used in a conventional glass of this type employed in the lamp industry for lamp bulbs is given below in Table I, the amounts being expressed in percentages by weight as calculated from the batch.

TABLE I

COMPOSITION OF SODA-LIME SILICATE GLASS

| Constituent | Amount (Percent By Weight) | Bulb Glass (Percent By Weight) |
|---|---|---|
| $SiO_2$ | 60–75 | 72.5 |
| $Na_2O$ | 5–18 | 16.5 |
| $CaO$ | 4–13 | 5.3 |
| $MgO$ | | 3.7 |
| $Al_2O_3$ | 0.5–3.4 | 1.7 |
| $K_2O$ | 0.1–2 | 0.18 |

Small amounts of $As_2O_3$ or $Sb_2O_3$ can also be included as fining agents if desired.

While soda-lime silicate glass is preferred since it is also used in making bottles and other containers and is readily available as scrap glass, other low-melting point glasses such as well known lime or lead glasses can also be used.

A small amount of bentonite can also be included in the raw-mix composition. Bentonite is magnesium-aluminum silicate ($MgO.Al_2O_3.4SiO_2O$) — a naturally-occurring clay-like mineral that is named after the Ft. Benton formation in the upper Missouri Valley A small amount of an inorganic pigment can also be included in the raw-mix to provide a distinctive body color. For example, a very small amount of cobalt oxide will provide a blue ceramic body, manganese dioxide will produce a greyish color, and iron oxide will provide a reddish body color. The natural color of the composition, after firing, is a pleasing milky-white.

The permissible ranges of the various constituents and a preferred composition are given below in Table II.

TABLE II

| | RAW MIX COMPOSITION | | |
|---|---|---|---|
| Constituent | Range (% By Weight) | Preferred (% By Weight) | Batch Weight (grams) |
| Powdered Soda-Lime Silicate Glass | 25–45 | 40 | 40 |
| Ball Clay | 25–45 | 40 | 40 |
| Wollastonite | 10–25 | 16 | 16 |
| Bentonite | 0–5 | 4 | 4 |
| Inorganic Pigment | 0–5 | — | 4 |

While wollastonite is listed in the above table, it will be understood that it can be replaced by the same amount of talc, petalite or potter's flint and mixtures of these minerals (which mixtures could also include wollastonite)

Figure 3:
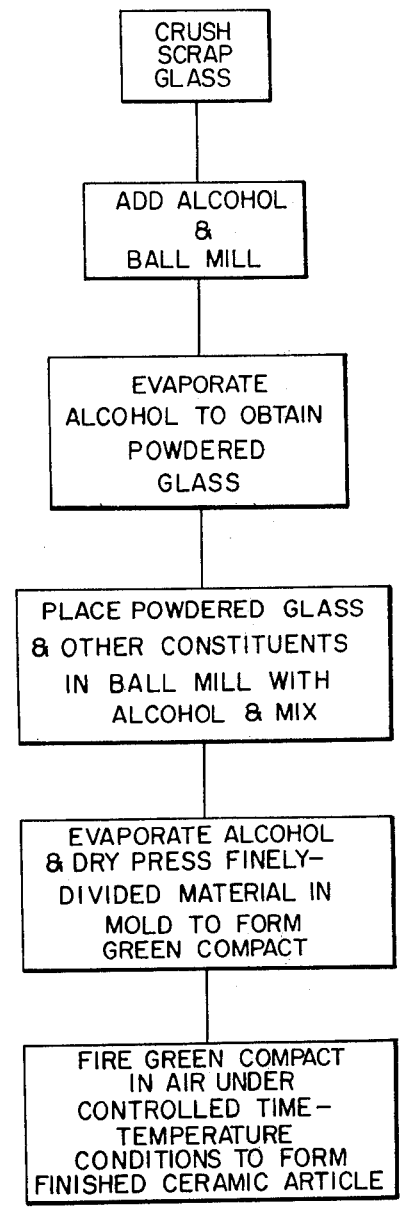
FIG. 3 is a flow diagram illustrating the various steps in fabricating an article according to a specific embodiment of the invention.

As indicated in the flow diagram depicted in FIG. 3, the glass cullet or other scrap glass is first crushed and ball-milled. As a specific example, the glass cullet is crushed into particles that pass through a 10 mesh screen, a one-gallon ball mill is charged with 1,200 grams of the glass particles and 1000 cc. of isopropyl alcohol, and the mixture is milled for 24 hours. The alcohol is then evaporated — thus producing a powdered glass that has an average particle size of about 5 microns, as measured by a Fisher Subsieve Sizer.

Formula weights of the various constituents are then weighed out in 200 gram batches and placed into a one quart ball mill together with 250 cc. of isopropyl alcohol. This mixture is milled for approximately 4 hours and the alcohol is evaporated off to provide the raw-mix composition which is used for the dry pressing or molding operation. A measured quantity of this composition (for example, between 2 and 3½ grams in the case of a medium-screw type base insulator such as that shown in FIGS. 1 and 2) is placed in a hardened steel mold and subjected to a pressure in a range of from about 1,000 to 7,000 pounds per square inch. The resulting green compact is then placed in a furnace and fired in air at a temperature above the softening point of the glass for a sufficient time to melt or fuse the powdered glass and convert the compact into a hard ceramic article having a very dense impervious structure.

In the case of the raw-mix composition given in Table II which contains powdered soda-lime silicate glass, the green compacts should be fired at a temperature above 800°C and preferably at a temperature in the range of between about 1,000°C and 1,050°C for from 10 minutes to 1 hour. Of course, the density and porosity of the finished ceramic article will vary depending upon the particular raw-mix formulation, the molding pressure, and the firing time and temperature which are used.

For the preferred raw-mix formulation given above in Table II, the optimum molding pressure is about 5,000 pounds per square inch and the optimum firing schedule is a 15 to 45 minute bake at a temperature of between about 1,000°C and 1,050°C. Ceramic bodies prepared in this manner have a pressed density of about 1.5 grams per cc., a density of about 1.9 grams per cc.

after being fired for 40 minutes at 1,050°C, an absorption that ranged from about 0.5 to 6%, and a shrinkage factor of from about 8 to 12% based on their "as-pressed" dimensions.

To facilitate the dry-molding operation and provide stronger pressed compacts which can be handled readily without breaking, a suitable binder-lubricant material is desirably added to the raw-mix composition after the ball milling operation has been completed. As a specific example, excellent results have been obtained by blending into the raw-mix about 2½% by weight of a wax emulsion type binder-lubricant which is marketed by the Mobil Oil Company under the trade designation "Cerumul C" and is a by-product of petroleum distillation. Of course, this material "burns out" of the compact during the firing operation and is not present in the finished ceramic body.

Removal of the pressed compact from the mold can be facilitated by blending about ½% by weight of zinc stearate into the raw-mix composition after the aforementioned binder-lubricant has been admixed. The zinc stearate also inhibits excessive wear of the molding dies and thus extends their useful lives.

I claim as my invention:

1. A composition which forms a dense ceramic article when compressed and subsequently fired in air at a temature of about 1,000°C. for 10 minutes to 1 hour, said composition consisting essentially of; from about 25% to 45% by weight of clay, (b) from about 25% to 45% by weight of powdered glass that has a softening point below about 800°C., and (c) from about 10% to 25% by weight of a mineral selected from the group consisting of wollastonite, talc, petalite, potter's flint, and mixtures thereof.

2. The ceramic composition of claim 1 wherein up to 5% by weight of bentonite is also present in the raw-mix.

3. The ceramic composition of claim 1 wherein up to 5% by weight of an inorganic pigment selected from the group consisting of cobalt oxide, manganese oxide and iron oxide is also present in the raw mix.

4. The ceramic composition of claim 1 wherein; said mineral is wollastonite, and up to 5% by weight of bentonite and up to 5% by weight of an inorganic pigment selected from the group consisting of cobalt oxide, manganese oxide and iron oxide are also present in the raw mix.

5. A ceramic article of dense impervious structure consisting essentially of a composition (A) fired at a temperature of from about 800° to 1100°C. and (B), in its raw-mix state, consisting essentially of
   a. from about 10% to 25% by weight of a mineral selected from the group consisting of wollastonite, talc, petalite, potter's flint, and mixtures thereof;
   b. from about 25% to 45% by weight ball clay; and
   c. from about 25% to 45% by weight of a powdered glass selected from the group consisting of lime glass, lead glass and soda-lime silicate glass.

6. The ceramic article of claim 5 wherein up to about 5% by weight of bentonite is also present in the raw mix.

7. The ceramic article of claim 6 wherein up to about 5% of an inorganic pigment selected from the group consisting of cobalt oxide, manganese oxide and iron oxide is also present in the raw mix.

8. A ceramic insulator for an electric lamp base or similar device consisting of a pressure-molded and fired mixture that consists essentially of from about 10% to 25% by weight of wollastonite, from about 25% to 45% by weight ball clay, and from about 25% to 45% by weight of a powdered glass that has a softening point below about 800°C.

9. The ceramic base insulator of claim 8 wherein said powdered glass consists essentially of soda-lime silicate glass which has a softening point of about 690°C.

10. The ceramic base insulator of claim 8 wherein up to about 5% by weight of bentonite is also present in said mixture.

11. The ceramic base insulator of claim 10 wherein said mixture has the following formulation:

| Constituent | Percent by Weight |
|---|---|
| ball clay | 40 |
| powdered soda-lime silicate glass | 40 |
| wollastonite | 16 |
| bentonite | 4. |

* * * * *